United States Patent [19]

Adler et al.

[11] Patent Number: 4,609,907

[45] Date of Patent: Sep. 2, 1986

[54] DUAL CHANNEL PARTIAL RESPONSE SYSTEM

[75] Inventors: Roy L. Adler, Ossining; Peter A. Franaszek, Katonah, both of N.Y.; Martin Hassner, Morgan Hill, Calif.; Richard C. Schneider, Tucson, Ariz.

[73] Assignee: International Business Machines Corporation, Armonk, N.Y.

[21] Appl. No.: 666,842

[22] Filed: Oct. 31, 1984

[51] Int. Cl.$^4$ ............................................. H03M 1/12
[52] U.S. Cl. ................................ 340/347 DD; 375/18
[58] Field of Search .................... 340/347 DD; 375/18

[56] References Cited

U.S. PATENT DOCUMENTS 3,622,986 12/1969 Tang et al. ............. 340/347 DD X
3,647,964  3/1972 Tang ...................... 340/347 DD X Primary Examiner—William M. Shoop, Jr.
Assistant Examiner—Saul M. Bergmann
Attorney, Agent, or Firm—George E. Clark; Thomas P. Dowd

[57] ABSTRACT

Method and apparatus is described for encoding and decoding a stream of randomly distributed binary bits representing digital data, including an encoder for encoding the bit stream to achieve a run length limited, partial response coding of the stream; a recording medium for recording the encoded stream; and a decoding system for recovering timing signals and a stream of data signals separately from the recorded stream using a first channel for decoding the recorded stream to recover a timing signal stream; therefrom; and a second channel for decoding the recorded stream to recover a stream of data signals therefrom.

14 Claims, 1 Drawing Figure

DUAL CHANNEL PARTIAL RESPONSE SYSTEM

BACKGROUND OF THE INVENTION

1. Field of the Invention

The present invention relates to method and apparatus for data encoding and decoding and more particularly to method and apparatus for bandwidth compression employing partial response and run length limited coding.

It is well known and understood in the prior art that conventional NRZI recording uses a wide channel bandwidth where the bandwidth and signal shape are chosen such that there is no intersymbol interference at sample time.

Some time ago, Kobayashi and others suggested the use of a $1-D^2$ or class IV Partial Response Channel in magnetic recording. This has a narrower bandwidth in practical terms as much as a factor of two reduction in comparison to conventional NRZI recording.

The significant advantage of the $1-D^2$ channel is its half bandwidth which significantly reduces noise. A second advantage is that a Viterbi decoder can be used to further enhance detection over bit by bit detection. The Viterbi decoder is described in articles entitled "Error Bounds for Convolutional Codes and Asymtotically Optimum Decoding Algorithm", IEEE Transactions on Information Theory No. IT-13 Page 260, 1967, by A. J. Viterbi; and by T. K. Omura, "On the Viterbi Decoding Algorithm" IEEE Transactions on Information Theory Vol. IT-15, Pages 177–179, January 1969.

Inspection of the equalized read signal indicates that there is a problem deriving clocking information. This is because neither the signal peaks nor the signal zero crossings have a consistent time position relative to the bit cell. Sometimes they are at the center of the bit cell, with other patterns they are at the edge.

Prior art solutions to this clocking problem involve:
(a) Use of a double bandwidth channel for clocking;
(b) Use of a pilot tone; and
(c) Use of Viterbi decoder information in clocking.

At high densities, solution (a) introduces too much high frequency noise; solution (b) has been used in non-magnetic recording channels but is impractical in magnetic recording, and solution (c) while possible, involves a great deal more complexity than even the Viterbi decoder.

The solution to the clocking problem in accordance with the present invention which is applicable to magnetic recording with minimum complexity is to use a $1+D$ class I Partial Response Channel for clocking. Since the $1-D^2$ channel can be factored into a $(1+D)(1-D)$ channel, the potential for sharing some of the $1-D^2$ equalization exists. In any case, the $1+D$ channel also has a bandwidth that is half the conventional bandwidth. In some applications, the $1+D$ channel could perhaps be used by itself. However, in magnetic recording applications a large amount of low frequency boost is required in the read equalizer to compensate for losses in the read process. Thus, low frequency noise will be enhanced in a $1+D$ channel. This is especially true if a magnetoresistive head is used because of low frequency thermal spikes generated at the read-head/media interface. Since the clock will average out noise errors, the noise problem is less severe for clocking compared with data detection. Thus, the solution according to the present invention is to use a $1-D^2$ channel for detection of data and a $1+D$ channel for clocking. This minimizes base line wander of the read signal used in detection and reduces the amount of low frequency boost required. This in turn reduces the low frequency noise component. Further, clocking is easily derived from the read signal zero crossings which always occur at bit cell edges.

2. Description of the Prior Art

In the prior art there are many data encoding and decoding systems. The following are systems representative of the prior art.

U.S. Pat. No. 3,689,899, to Franaszek shows two possible (d, K) codes (1, 8) and (2, 7). The potential data codes are variable length, fixed rate state independent block codes. The coding rate of the (1, 8) code is ⅔ and its coding dictionary consists of 16 code words having lengths varying 3 to 9 bits, in multiples of three. The (2, 7) code has a coding rate of ½ and a dictionary consisting of seven words with lengths varying from two bits to eight bits, in multiples of two. The patent does not teach either the method or apparatus of the present invention.

An article by Franaszek entitled "Efficient Code for Digital Magnetic Recording" in the IBM Technical Disclosure Bulletin, Vol. 23, No. 9, February 1981, p. 4375 shows a bounded delay code and an article entitled "An Optimization of Modulation Codes in Digital Recording" in the IEEE Transactions on Magnetics, Vol. MEG-12, No. 6, November 1976, p. 740 shows a (1, 7) code together with a number of other codes. However, the codes produced and the apparatus embodying such codes are substantially different from the codes and apparatus according to the present invention.

An article entitled "Zero modulation in Magnetic Recording" by Patel published in the IBM Journal of Research and Development July 1975 pages 366 to 378 describes a charge transition rule for obtaining a DC null in the coded data. This constraint arises because of a rotating magnetic head that is AC coupled and hence can not transfer DC.

An article by Kobayashi et al entitled "Application of Partial Response Channel Coding to Magnetic Recording Systems" in the IBM Journal of Research and Development July 1970 at page 368 to 375 suggested the previously mentioned use of a $1-D^2$ or Class IV Partial Response Channel in magnetic recording. However, the article does not show the use of a $1+D$ channel for recovering timing information in conjunction with a $1-D^2$ channel to recover data.

The prior art discussed above does not teach nor suggest the present invention as disclosed and claimed herein.

SUMMARY OF THE INVENTION

Therefore, it is an object of the present invention to encode and decode a stream of randomly distributed binary bits representing digital data.

It is another object of the present invention to encode and decode a stream of randomly distributed binary bits representing digital data, by a method and apparatus including an encoder for encoding a data input signal in accordance with a predetermined algorithm to achieve a run length limited, partial response coding of the data stream; a first partial response channel for recovering a timing signal stream from the encoded data stream; and a second partial response channel and decoder for recovering a stream of data signals from the encoded data stream.

It is yet another object of the present invention to encode data for reduced error storage on magnetic storage media employing the method and apparatus as set forth above.

Accordingly, the present invention includes method and apparatus for encoding and decoding a stream of randomly distributed binary bits representing digital data, including an encoder for encoding a coded output in accordance with a predetermined algorithm to achieve a run length limited, partial response coding of the data stream; a first partial response channel for recovering a timing signal stream; and a second partial response channel and decoder for recovering a stream of data signals from the encoded data stream.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

Figure 1:
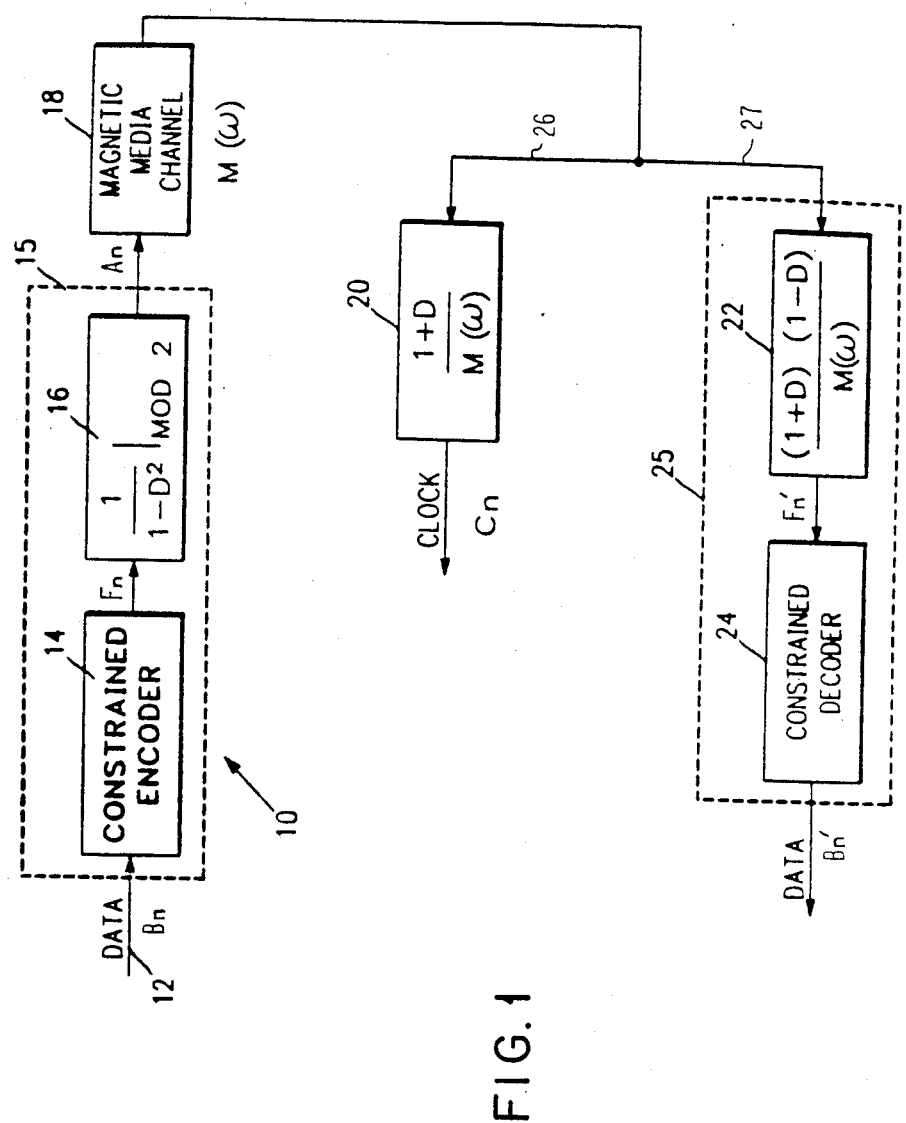
FIG. 1 is a block diagram of a magnetic recording system employing the method and apparatus according to the present invention.

In the past, various methods have been proposed for increasing the recorded data density on media such as magnetic disks or tapes. One approach utilized is known as run-length limited coding which requires that each "1" in a coded bit sequence be separated from the nearest adjacent "1" by a specified number of "0's". This number must be at least equal to a minimum quantity d because of intersymbol interference but must not exceed a maximum of K which is required for self-clocking purposes. Codes following this format are generally referred to as (d, K) run length limited codes. The present invention relates to an encoding, magnetic recording, reading, and decoding system which employs a code that guarantees transitions for self timing at the output of the (1+D) channel as well as a null in the spectrum at zero frequency. The latter property is to minimize noise resulting from the low frequency boost required in a (1+D) channel, as mentioned above. The transitions for self timing are ensured by the property that the output of the (1+D) channel has no more than five consecutive like symbols. An encoder includes a sequential map that maps three unconstrained input binary bits into four constrained bits in a noiseless manner which prevents propagation of errors of more than three bits at the decoder due to random noise. To convert unconstrained data in a (d, K) constrained format generally requires that m unconstrained bits be mapped into n constrained bits, where m is less than n. The ratio m/n is usually referred to as the coding rate or efficiency. It is obviously desirable to maximize this rate. The trade-offs usually considered in maximizing the rate are the decoding look-ahead and hardware complexity.

Raising the coding efficiency or rate at the expense of decoding look-ahead generally results in increasing the error propagation. That is, a single bit error introduced in the code stream will cause a certain number of subsequent bits to also be erroneous before the coding algorithm becomes self-correcting. It is always desirable to minimize error propagation.

The present invention as embodied herein and shown in FIG. 1 relates to a new type of digital recording technique which may be used for example in magnetic recording systems.

Partial response or correlative coding has been previously used as a method for reducing frequency bandwidths required for digital transmission. The present invention combines partial response coding with the use of a new constrained code to ensure sufficient timing information and reduce error propagation. The recorded signal is processed in two paths to recover timing and data streams.

Referring now to FIG. 1, it is seen that an input binary data stream 12 (Bn) may be regarded as being encoded by a constrained encoder 14 into a partially encoded stream Fn and then by partial response encoder or precoder 16 into a fully encoded stream An before being recorded on a magnetic medium in a magnetic media channel 18. In the preferred embodiment of the present invention, however, the functions of constrained encoder 14 and partial response precoder 16 are combined into a single encoder 10, implemented here by lookup table 15 having $B_n$ as input and An as output.

In order to recover the input binary data stream Bn a signal $M(\omega)$ is obtained by reading out the magnetic medium in the magnetic media channel 18. This readout signal $M(\omega)$ contains data signals and timing information.

The decoding of the data and timing stream from the magnetic media channel 18 is divided into two separate paths. A first path 26 processes the recovered signal through a first partial response channel 20, comprising a read-equalizer with transfer function $(1+D)/M(\omega)$ and a decoder, to recover timing information Cn for clocking purposes. A second path 27 processes the read out signal through a second partial response channel 22, comprising a read-equalizer with transfer function $(1+D)(1-D)/M(\omega)$ and a decoder, and then through a constrained decoder 24. These processing operations recover the input binary data stream Bn with minimum error propagation from the binary data stream 12 which was inputted to encoder 14.

It should be noted that the form of partial response encoder 16 and decoder channels 20 and 22 are all well known and could be readily implemented by persons skilled in the art without invention or undue experimentation.

The input binary stream Bn comprises a sequence of data blocks or words Bi. The partially encoded data stream Fn comprises a sequence of data blocks or words Fi. The fully encoded data stream An comprises a sequence of data blocks or words Ai.

Magnetic media channel 18 could be any known saturated magnetic recording process with associated digital electronics and logic circuits all of which are well known in the art. The convention being followed is that a binary symbol 0 in an input data block Ai results in no change in saturation level, and a binary symbol 1 in an input data block Ai results in a change in saturation level.

Therefore, the present invention is focussed upon the combination of a known partial response precoder 16 with a run length limited constrained encoder 14 and constrained decoder 24 together with the technique of obtaining timing information in a decoding system through a separate path from data recovery as is shown in FIG. 1.

In a preferred embodiment of the present invention, the system shown in FIG. 1 may be implemented on a general purpose digital computer system such as an IBM System 370 Series Processor wherein the encoder 14 and partial response precoder 16 are combined and implemented by a look-up table 15. The transfer function for look-up table 15 is shown by Table I below. Similarly, the function of constrained decoder 24 may be implemented by a look-up table the transfer function for which is also illustrated in Table I, with the blocks or words Fi of the input F'n being shown in column 2, and the blocks or words Bi of the output B'n being shown in column 1.

As indicated, the partial response channel 20 includes a read-equalizer with a transfer function of $(1+D)/M(\omega)$, where $M(\omega)$ is the contribution of the saturated magnetic recording channel 18 as a result of the input recording signal corresponding to An. The read-equalizer in conjunction with the magnetic media channel 18 provides channel 20 with a transfer function of $(1+D)$ and the signal in this channel will have zero crossings at the bit cell edges that are converted by the decoder into clock pulses Cn which control a phase lock loop clock (not shown) to provide clock information. Similarly, channel 22 combines a read-equalizer with transfer function $(I+D) (I-D)/M(\omega)$ and the channel 18 input, to provide a channel transfer function of $(I-D^2)$ and an output data stream F'n which, in the absence of transmitting or receiving errors in channel 18, will be the same as encoded stream Fn. The output B'n of constrained decoder 24 will in turn be the same as input data Bn in the absence of such errors. Channels 20 and 22 may be implemented by any of several read-equalizers and partial response decoders known in the art. (See Kobayashi et al above).

Referring to Table I, the encoding of input blocks or words three unconstrained bits to blocks or words of four constrained bits coupled with the partial response coding is shown. The words of the input binary data stream are represented by Bi, the code words in the fully encoded data stream are represented by $A_i$. Each code word Ai designated as even or odd depending on the values of the symbols which form the word. A code word Ai in the encoded output has a first value if the preceding word Ai is designated as even and a second value if the preceding word Ai is designated as odd. These two alternative words Ai are given in columns 3 and 5 respectively in Table I.

A running sum is accumulated which represents the D.C. accumulation of the recorded signal and the value of each word Ai is selected so that it's associated value of S to contribute to the D.C. running sum. For each input binary word Bi the constrained encoder 14 provides two alternative values of Fi (column 2, Table (I) and for each of these values of Fi the partial response encoder 16 provides a code word Ai. For each input binary word Bi a code word Fi and the corresponding code word Ai having a value s are shown so that the D.C. running sum tends to remain at zero. For example, an input data word "101" can be encoded as a code word Ai equal to 0011 or 1011 depending upon the value of the D.C. running sum. The appropriate value of Ai would be selected so as to tend to maintain the D.C. running sum, at zero. For example, if the D.C. running sum were positive, then for an input data word of "101" the value of Ai chosen would be "0011" having a value S of −2 which when added to the running sum would bring the running sum to 0. The example discussed assumes that the preceding code word Ai is designated as even and the code words Ai in column 3 of Table I are used. The situation would be similar if a preceding code word Ai is designated as odd, except that the values of the code words Ai in column 5 of Table I would be used.

The use of the table look-up to generate the encoded data allows the flexibility of maintaining a zero D.C. component in the encoded data stream regardless of the history of the encoded data.

TABLE I

| IN-PUT $B_i$ | Partially (encoded/decoded) $F_i$ | (Preceding Ai) (designated even) $A_i$ | S | (Preceding Ai) (designated odd) $A_i$ | S |
|---|---|---|---|---|---|
| 0 0 0 | 0 0 1 1 | 0 0 1 0 | 0 | 1 1 0 1 | 0 |
| 0 0 1 | 0 1 1 1 | 0 1 0 1 | 0 | 1 0 1 0 | 0 |
| 0 1 0 | 0 1 0 0 | 0 1 1 1 | 0 | 0 1 1 1 | 0 |
| 0 1 1 | 1 1 1 1 | 1 0 1 0 | 0 | 0 1 0 1 | |
| 1 0 0 | 1 0 1 1 | 1 1 0 1 | 0 | 0 0 1 0 | |
| 1 0 1 | 0 0 1 0 | 0 0 1 1 | −2 | 0 1 0 0 | −2 |
| | 1 1 1 0 | 1 0 1 1 | 2 | 0 1 0 0 | 2 |
| 1 1 0 | 0 1 0 1 | 0 1 1 0 | −2 | 1 0 0 1 | 2 |
| | 1 1 0 1 | 1 0 0 1 | 2 | 0 1 1 0 | −2 |
| 1 1 1 | 1 0 1 0 | 1 1 0 0 | −2 | 0 0 1 1 | −2 |
| | 0 1 1 0 | 0 1 0 0 | 2 | 1 0 1 1 | 2 | where:
$B_i$ = words in the binary input data stream Bn
$F_i$ = code words in the partially encoded stream Fn
$A_i$ = code words in the fully encoded stream An where:
$B_i$=words in the binary input data stream Bn
$F_i$=code words in the partially encoded stream Fn
$A_i$=code words in the fully encoded stream An Thus, while the invention has been described with reference to preferred embodiments thereof, it will be understood by those skilled in the art that various changes in form and details may be made without departing from the scope of the invention.

What is claimed is:

1. Apparatus for encoding and decoding a stream of randomly distributed binary bits representing digital data, comprising:
   encoding means for encoding said stream of binary bits to achieve a run length limited, partial response coding of said stream;
   recording means for recording representations of said encoded stream of binary bits and
   recovery means for recovering timing signals and a stream of data signals from said recorded representations, comprising:
      first partial response decoding means for decoding said recorded representations to recover a timing signal therefrom; and
      second partial response decoding means for decoding said recorded representations to recover a stream of data signals therefrom.

2. Apparatus according to claim 1, wherein said encoding means comprises:
   table lookup means for encoding m unconstrained bits into n constrained bits, m being less than n.

3. Apparatus according to claim 1, wherein said first partial response decoding means comprises:
   table lookup means for decoding a timing signal from said recorded representations.

4. Apparatus according to claim 1, wherein said second partial response and decoding means comprises:

table lookup means for decoding data signals from said recorded representations.

5. Apparatus according to claim 1, wherein said encoding means further comprises:
a partial response channel having a transfer function of $1/(1+D)(1-D)$.

6. Apparatus according to claim 1, wherein said first partial response decoding means in combination with said recording means comprises:
a partial response channel having a transfer function of $(1+D)$.

7. Apparatus according to claim 1, wherein said second partial response decoding means in combination with said recording means comprises:
a partial response channel having a transfer function of $(1+D)(1-D)$.

8. A method for encoding and decoding a stream of randomly distributed binary bits representing digital data, comprising the steps of:
encoding said stream of binary bits to achieve a run length limited, partial response coding of said stream;
recording representations of said encoded stream of binary bits and
recovering timing signals and a stream of data signals from said recorded representations, by:
decoding said recorded representations in a first partial response decoding channel to recover a timing signal therefrom and
decoding said recorded representations in a second partial response decoding channel to recover a stream of data signals therefrom.

9. A method according to claim 8, wherein said encoding step further comprises: encoding m unconstrained bits into n constrained bits, m being less than n.

10. A method according to claim 8, wherein said decoding step in a first partial response decoding channel comprises:
decoding a timing signal from said recorded representations by table lookup.

11. A method according to claim 8, wherein said decoding step in a second partial response decoding channel comprises:
decoding data signals from said recorded repesentations by table lookup.

12. A method according to claim 8, wherein said encoding step further comprises:
encoding said data stream in a partial response channel having a transfer function of $1/(1+D)(1-D)$.

13. A method according to claim 8, wherein said first decoding step further comprises:
decoding said recorded representations in a partial response channel having a transfer function of $(1+D)$ to recover a timing signal.

14. A method according to claim 8, wherein said second decoding step further comprises:
decoding said recorded representations in a partial response channel having a transfer function of $(1+D)(1-D)$ to recover encoded data.

* * * * *